(12) United States Patent
Elbern et al.

(10) Patent No.: US 6,638,436 B2
(45) Date of Patent: Oct. 28, 2003

(54) METHOD AND ARRANGEMENT FOR REGENERATING A CONTAMINATED METAL BATH

(75) Inventors: Klaus Elbern, Aachen (DE); Robert Leffers, Mönchengladbach (DE); Albert Rumbach, Aachen (DE)

(73) Assignee: Stolberger Metallwerke GmbH & Co. KG, Stolberg (DE)

( * ) Notice: Subject to any disclaimer, the term of this patent is extended or adjusted under 35 U.S.C. 154(b) by 43 days.

(21) Appl. No.: 09/843,092

(22) Filed: Apr. 26, 2001

(65) Prior Publication Data

US 2001/0041226 A1 Nov. 15, 2001

(30) Foreign Application Priority Data

Apr. 26, 2000 (DE) .......................... 100 20 284

(51) Int. Cl.$^7$ ............................. B01D 9/02; B01D 37/00
(52) U.S. Cl. ................... 210/773; 210/774; 210/805; 210/175; 427/431; 427/433; 427/436; 118/400
(58) Field of Search ................. 210/773, 774, 210/775, 805, 184, 185, 186, 175; 427/431, 433, 436; 118/400

(56) References Cited

U.S. PATENT DOCUMENTS

| | | | | |
|---|---|---|---|---|
| 2,745,552 A | * | 5/1956 | Bruggeman et al. | |
| 3,552,485 A | * | 1/1971 | Jannou | 210/186 |
| 3,854,933 A | * | 12/1974 | Furukawa et al. | |
| 3,873,447 A | * | 3/1975 | Pohl | 210/187 |
| 4,693,088 A | * | 9/1987 | Latge | 210/186 |
| 4,756,876 A | * | 7/1988 | Dagard et al. | 210/181 |
| 4,892,653 A | * | 1/1990 | Latge | 210/184 |
| 5,211,831 A | * | 5/1993 | Vitale et al. | |
| 5,227,046 A | * | 7/1993 | Murphy et al. | |

* cited by examiner

*Primary Examiner*—Robert J. Popovics
(74) *Attorney, Agent, or Firm*—Kenyon & Kenyon

(57) ABSTRACT

A method and a system for regenerating a metal bath contaminated by mixed crystals, particularly a tin bath (17) in a hot-dip coating process. A partial stream of the tin bath (17) is removed from the coating tank (15) and is first of all heated above its liquidus temperature in a heating unit (24). Subsequently, the tin bath is conducted over a cooling unit (27) and, while flowing through a filter (29), is cleaned of mixed crystals coming down as a result of the cooling. The filter 29 is a ceramic foam filter made of silicon carbide. Subsequently, the regenerated tin bath (17*a*) is heated in a melting tank to process temperature, and returned from there to the coating tank (15).

9 Claims, 2 Drawing Sheets

METHOD AND ARRANGEMENT FOR REGENERATING A CONTAMINATED METAL BATH

BACKGROUND OF THE INVENTION

1. Field of the Invention

The present invention relates to a method for regenerating a metal bath contaminated by mixed crystals, in particular a tin bath of a hot-dip coating process, in which the metal bath is first heated above its liquidus temperature and then the mixed crystals coming down during cooling are mechanically removed. The invention also relates to an arrangement for carrying out such a method.

2. Description of Related Art

Metal objects are mostly provided with metal coatings for reasons of corrosion and wear protection, or to attain greater surface hardness. Improvement of the sliding properties or achieving a decorative look can also be the aim of such a coating. A pure metallic surface coating is demanded especially with copper materials in many of its uses and industrial applications, for example, in producing electrical plug connectors.

Use of the metal bath method is widespread, especially for coating metal bands, for example in hot-dip tinning or galvanizing. In these processes, a metal tape and fluxing salts are guided through a metal bath consisting of the coating metal. As a result of diffusion processes between the metal atoms of the fluid coating metal and the atoms of the base metal alloy layers are formed. When the metal tape is pulled out of the metal bath, a layer of pure coating metal is found on its surface. The thickness of the coating's layer is set either by mechanical stripping off or by blowing it off, using air or protective gas.

During the course of the coating process, a metal bath is contaminated by chemical reaction. The cause for this is especially that metal or alloy components of the dipped objects are dissolved in the metal bath. Cracking of unused flux also causes contamination. This chemical change of the metal bath deteriorates the coating results, mainly by changing the consistency of the metal bath, and thereby its wetting performance. The molten baths subsequently become unusable with increasing working life.

By increasing the operating temperature of the metal bath the working life can be prolonged. Though, this measure leads to an increase in the solution effect, with the result that the contamination of the metal bath increases faster and more strongly.

When the maximum permissible concentration of undesired components has been reached, the coating tank is taken out of the line and cleaned. This happens intermittently. To do this, the metal bath is first heated to a temperature above its liquidus temperature. Above this temperature all alloy components go into solution. The contaminants in the metal bath, mostly mixed crystals of combinations of the base metal and the coating metal, also go back into solution. After that, stainless steel strainers are pressed into the metal bath. Such strainers usually have a mesh size of 5 mm. The metal bath is then cooled convectively, until the temperature has sunk to the level where the mixed crystals come down. Now the strainers are pulled out of the metal bath, and the mixed crystals are thereby mechanically removed.

This procedure is repeated several times, until the desired regeneration of the metal bath has taken place, and chemical analysis confirms the desired composition of the metal bath. The contaminants form the metal bath remain in the strainers, and are subsequently burned out thermally and returned for further use. Alternatively, the mixed crystals can be spooned out of the tank sump with the aid of a perforated ladle.

Frequently the separation process has to be repeated up to ten times before a desired composition of the metal bath is reached. As a result, this method for regenerating the metal bath is time and labor intensive.

SUMMARY OF THE INVENTION

It is an object of the invention to provide a method and an arrangement which make possible efficient regeneration of a metal bath contaminated by mixed crystals, when using efficient and economical working procedures. This and other objects of the invention are achieved by a method for regenerating a metal bath contaminated by mixed crystals, particularly a tin bath in a hot-dip coating process, in which the metal bath is first of all heated above its liquidus temperature, and then the mixed crystals coming down during cooling are mechanically removed, wherein the metal bath, after being heated to at least its liquidus temperature is conducted over a cooling unit and, during the flow-through, is guided through at least one filter. An arrangement for carrying out this method includes a pump for conveying metal bath from a tank to the cooling unit and to the filter downstream from it.

BRIEF DESCRIPTION OF THE DRAWINGS

In the following, the present invention is described in greater detail with the aid of two exemplary embodiments. The figures show.

DETAILED DESCRIPTION OF THE INVENTION

Figure 1:
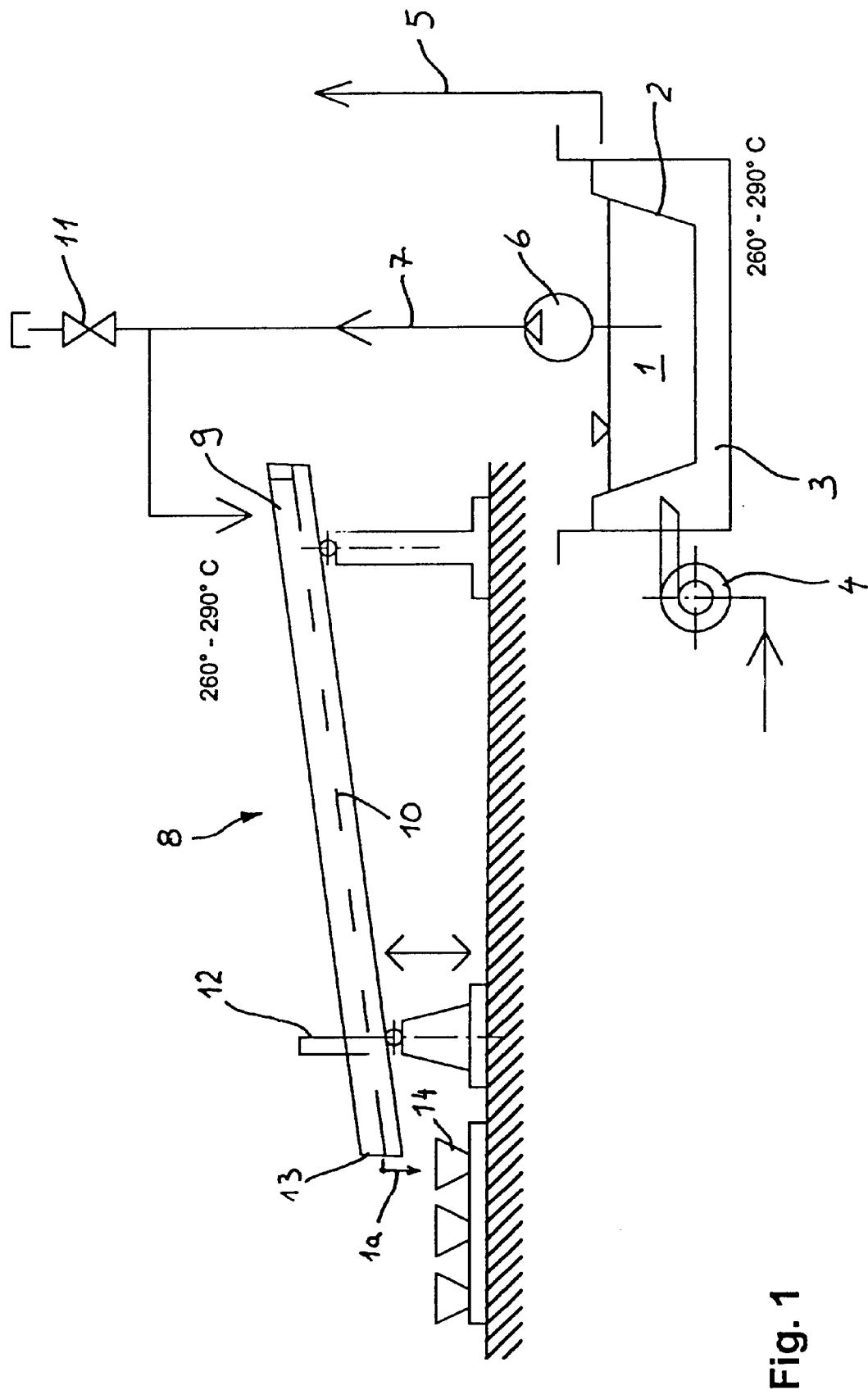
FIG. 1 a first arrangement for regenerating a metal bath, illustrated schematically, and FIG. 2 the schematic of a hot-dip coating process with continuous regeneration of the metal bath.

The central point of the present invention is formed by the measure of heating the metal bath and then taking it, via a cooling unit, at least to the liquidus temperature or a temperature above that, and having it flow through at least one filter.

As a result of the filtration of the metal bath provided by the present invention, an inadmissible contamination of the molten bath can be avoided, and a nearly constant operating condition can be reached.

The method according to the present invention can be carried out as a continuous regeneration in parallel to the running tinning process as well as a discontinuous working procedure, that is, outside the process line. A very efficient cleaning of the metal bath is undertaken, using an effective working procedure Even after running through one filter procedure the metal bath again has the quality for reuse. Of course, several filter processes are also possible, depending on operating requirements and conditions. A series connection of a plurality of filters, one after another, is practicable, with extraction of mixed crystal conglomerates according to size. A parallel connection of filters, and a subdivision of the metal bath to be regenerated into partial streams, is also possible, whereby increased performance can be achieved along with shortened regeneration times.

Ceramic filters, especially foam filters based on silicon carbide or aluminum oxide filters are preferably used. These filter media reach a very high filtering effectiveness when their porosity is adjusted to the type of metal bath to be regenerated. Even the smallest contaminant particles are retained by the large inner surface of the filtration bodies. Besides foam-ceramic filters made of silicon carbide, in practice deep bed filters filled with tabular aluminum oxide spheres are available too.

The metal bath to be regenerated is conducted in a continuous flow through the filters. After the heating of the filters, the flow rate of the filters increases until saturation sets in. After that, the flow rate drops off slowly with increased filtering. In time to prevent an inadmissible performance drop, the filters are exchanged, so that a uniform flow rate can be set. By heating the exchanged filters to the appropriate temperature, they can be regenerated for multiple use.

In accordance with one embodiment of the invention, there is provided regeneration coupled directly to the hot-dip coating process. According to that, the metal bath is taken as a split stream from the coating tank during the coating process, and is heated, cooled and filtered on the way to a melting tank. In the melting tank, the regenerated metal bath is then heated to the charging temperature, whereupon the metal bath is taken back from the melting tank to the coating tank. This makes possible a continuous parallel time regeneration of the metal bath in on-line operation. By appropriate adjustment of the operating parameters, particularly of the relationship of regenerated metal bath to the metal bath in the melting tank, a uniform operating condition of the coating process can be reached.

The method according to the present invention is fundamentally suitable for the regeneration of various kinds of metal baths.

The method according to the present invention is especially advantageous for regenerating tin baths, which are characterized in that they contain more than 50% tin. In line with that, the tin bath, depending on its degree of contamination on the way to the filter, should first be heated to a temperature between 230° C. and 350° C. This is the temperature range in which the contaminating mixed crystals go into solution, and this temperature range also allows for tin alloy baths, e.g. tin-lead alloys. Thereafter, the metal bath is cooled to a temperature between 210° C. and 250° C. At this point the mixed crystals come down, so that they are retained when flowing through the filter.

Figure 2:
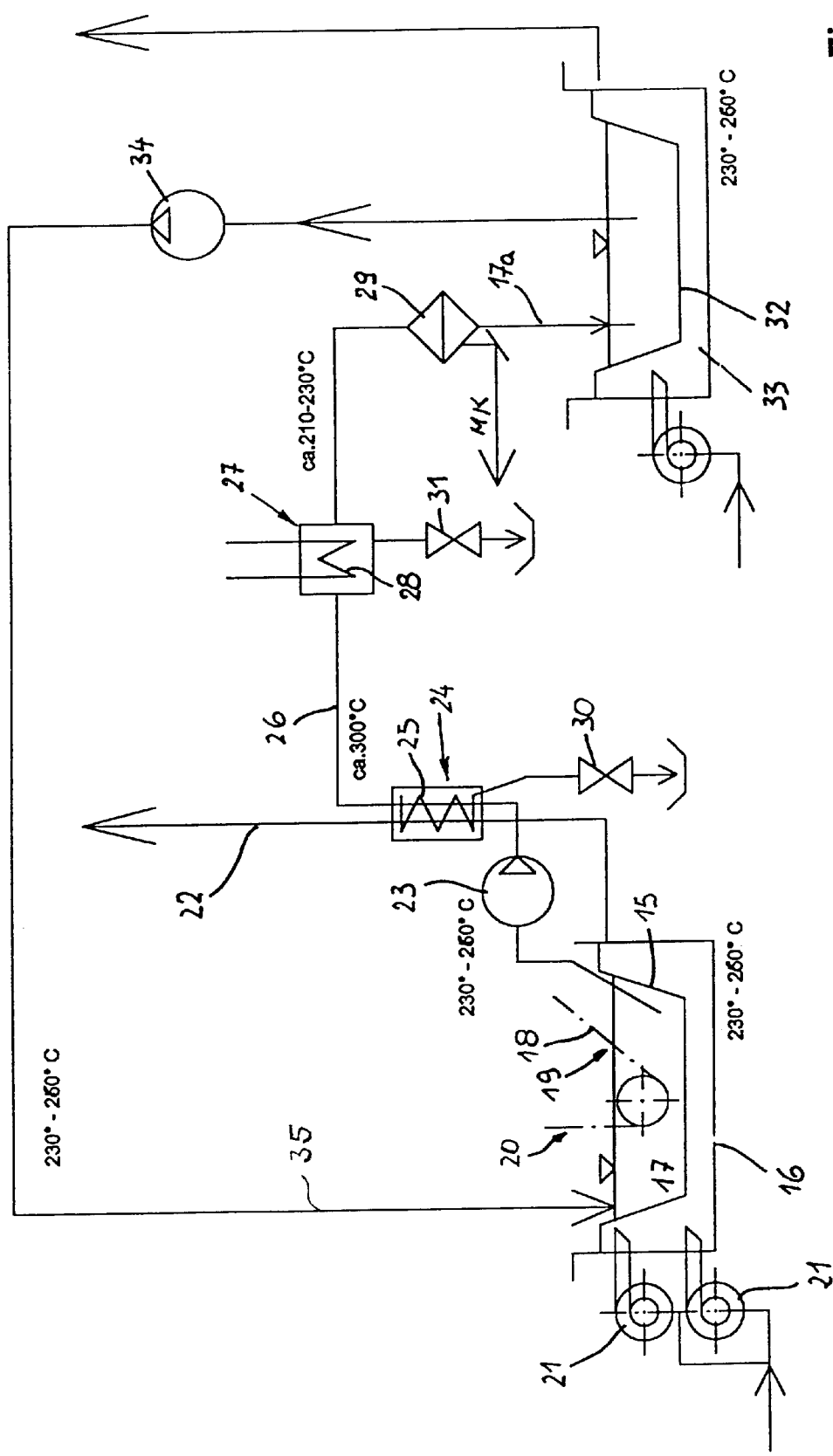

The method of the invention may be carried out by the system illustrated in FIGS. 1 and 2. There a pump is provided, which conveys the metal bath from a melting or coating tank to a cooling unit and to the filter connected after it. In practice, this arrangement is especially suitable for regenerating tin baths. A separately operated heating unit is connected ahead of the cooling unit. While running through the heating unit, the metal bath is preferably heated to its liquidus temperature or above it. Waste heat from the coating process may be used for heating the metal bath.

As has been mentioned, ceramic foam filters made of silicon carbide or aluminum oxide are preferred, even when fundamentally different filters can be applied for separating the contaminants. The foam filters are selected by porosity, according to the required filtering properties, depending on the metal bath to be regenerated. Filters having different porosities can also be arranged in series. Ceramic foam filters are advantageous also because they are easily cleaned.

An embodiment of the cooling unit advantageous in practice will now be described. There the cooling unit is designed as a downhill grade. The downhill grade is equipped with thermal elements so that the cooling process of the metal bath flowing on the downhill grade can be monitored and possibly influenced. While the metal bath flows over the downhill grade, it cools off, so that all the mixed crystals come down and are separated in the integrated filter or one that is connected in series. By changing the inclination of the downhill grade, the flow speed and the cooling rate can be influenced.

FIG. 1 shows a first arrangement for filtering a metal bath contaminated by mixed crystals, in this case, a tin bath 1.

The tin bath 1 is situated in melting tank 2 of a melting furnace 3. This is heated by a gas-fired burner 4. The tin bath 1 is heated, depending on the degree of contamination, to a temperature between 260° C. and 290° C. in the melting tank 2, acting as a heating unit. This temperature lies above the liquidus temperature of tin bath 1. On account of the specific properties of the tin bath 1, all alloying components are liquid at this temperature. The waste gas from melting oven 3 is disposed appropriately through a waste gas duct 5.

Liquid tin bath 1 is taken from melting tank 2 by tin pump 6 via pipe 7, of nominal size DN 50, to a cooling unit 8, formed by gutter 9 and downhill grade 10. A vent 11 is integrated into pipe 7.

The temperature of the tin bath 1 at the entry to gutter 9 is slightly below the described temperature of 260° C. to 290° C. While the tin bath 1 is flowing through gutter 9, it is cooled to a temperature below the liquidus temperature, in the present case to about 210° C. to 230° C., so that mixed crystals come down. The flow speed of tin bath 1 on the downhill grade 10 can be influenced by adjusting the angle of inclination of gutter 9. Basically, it should be pointed out that the various temperatures or temperature ranges are dependent, from a process engineering point of view, on the composition of the metal bath and the degree of contamination.

The mixed crystals are separated by a plug-in filter 12 at the end of the downhill grade 10. The plug-in filter 12 is a ceramic foam filter made of silicon carbide or aluminum oxide.

Gutter 9 is furnished with thermal elements ca. 300 mm apart, so that the temperature can be monitored during the flow through gutter 9. When necessary, the flow speed can be regulated by intervening to adjust the inclination of the gutter 9. Through that, the desired cooling can be reached reliably by the time the material gets to plug-in filter 12. The regenerated tin bath 1a, freed from mixed crystals, subsequently reaches receiving tank 14 via outlet 13 of gutter 9, from which it can be conducted to the tinning process.

FIG. 2 explains schematically the concept of continuous regeneration of a tin bath contaminated during the tinning process.

In the coating tank 15 of a tinning line's heating furnace 16 there are usually ca 3.5 tons of tin bath 17. During the coating process, the tin bath is held at a temperature between 230° C. to 260° C. If necessary, the operating temperature can be raised to 280° C. But that is rather the exceptional situation.

A copper band 18 that is to be tinned runs through coating tank 15. At a band running speed between 60 m/min and 100 m/min, therefore, a maximum of 65 $m^2$ per minute of band surface are run through the tin bath 17. At the point of entry 19 the copper band has a surface temperature of ca. 140° C. At the point of exit 20, the copper band's temperature has risen to that of the tin bath 17. The amount of heat withdrawn from the tin bath 17 by the copper band 18 is returned to it by two regulated gas burners 21. The waste gas at ca. 800° C. is exhausted through a chimney 22.

While the copper band 18 is running through the tin bath 17, copper and possibly other alloy components, such as zinc in zinc-containing alloys, go into solution. Through this chemical change, the consistency and the wetting properties of the tin bath 17 deteriorate, so that the tinning result would suffer. That is prevented by a continuous filtering of tin bath 17, whereby a uniform operating condition can be set. To accomplish this, a partial stream of tin bath 17 in the running coating process is drawn off from the coating tank 15, and is conducted via a pump 23 to a heating unit 24 having a heat exchanger 25. Heating unit 24 is heated by waste gas. The hot waste gas from heating furnace 16 is used for this. The branched-off tin bath 17 is heated to ca. 300° C. by heat exchanger 25. This is above the liquidus temperature of tin bath 17, so that all the alloy components are present in liquid form. The hot tin bath 17 is taken by pipe 26 to cooling unit 27. In cooler 28 of cooling unit 27 the tin bath 17 is cooled to ca. 210° C. to 230° C., before it is taken to a filter 29. However, depending on the composition of the metal bath and its degree of contamination, a smaller temperature reduction, e.g. ΔT=20° C. to a temperature of 280° C. can also be sufficient to get the undesired mixed crystal conglomerates to come down. The heat exchanger 25 and the cooler 28 are both furnished with a facility 30 or 31, respectively, for emergency discharge.

Filter 29 is an oxide-ceramic foam filter. The mixed crystals coming down during the cooling process are separated from the tin bath 17 by this filter. The mixed crystals together with used filtering material can be moved on for reuse (arrow MK).

The purified tin bath 17a flows into melting tank 32 of a melting furnace 33. Melting furnace 33 is operated at the same temperature as heating furnace 16, so that the regenerated tin bath 17a is set to a temperature between 230° C. and 260° C.

Regenerated tin bath 17a is moved out of the melting tank 32, by a pump 34 and through a pipe 35, back into the coating tank 15 of the heating furnace 16. The quantities moved by pump 3 in withdrawing tin bath 17 from coating tank 15, and by pump 34 in returning regenerated tin bath 17a are mutually adjusted as to quantity, so that the bath level in coating tank 15 can be held constant, and the quality of tin bath 17 can be held uniform.

Besides the tin filtering described above, the same method can also be used for cleaning and recovering zinc baths, using an adapted equipment set-up. In that case, the temperatures in the production region lie around 550° C. and the liquidus temperatures around 600° C. It is possible to feed the liquid zinc bath in the gradient toward the cooling unit and the filter by the influence of gravity. This applies similarly for zinc-containing zinc baths (proportion of zinc a maximum of 15%), which are operated at a temperature range between 200° C. and 400° C.

Table of Reference Numerals
1—tin bath
1a—regenerated tin bath
2—melting tank
3—melting furnace
4—burner
5—waste gas duct
6—tin pump
7—pipe
8—cooling unit
9—gutter
10—downhill grade
11—ventilation
12—plug-in filter
13—outlet
14—receiving tank
15—coating tank
16—heating furnace
17—tin bath
1a—regenerated tin bath
18—copper band
19—inlet
20—outlet
21—gas burner
22—chimney
23—pump
24—heating unit
25—heat exchanger
26—pipe
27—cooling unit
28—cooler
29—filter
30—emergency discharge
32—melting tank
33—melting furnace
34—pump
35—pipe
MK—mixed crystals

What is claimed is:

1. A method for regenerating a metal bath contaminated by mixed crystals, comprising the steps of:
    (a) heating the metal bath to at or above its liquidus temperature to form a liquid metal bath,
    (b) conducting the liquid metal bath over a cooling unit designed as a gutter with a downhill grade and equipped with thermal elements,
    (c) removing mixed crystals coming down during cooling, wherein during flow-through, the bath is guided through at least one ceramic filter located at the end of the downhill grade to separate the mixed crystals and regenerate the bath, and
    (d) collecting the regenerated bath, free of mixed crystals, in a receiving tank, via an outlet of the gutter, wherein the regenerated bath is used in a coating process without requiring repetition of the separation step.

2. A The method according to claim 1, wherein a foam filter based on silicon carbide or an aluminum oxide filter is used.

3. The method according to claim 1, wherein the metal bath is a tin bath containing more than 50% tin, wherein the tin bath, on the way to the filter is first heated to a temperature $T_H$, between 230° C. and 350° C., and is subsequently cooled to a temperature $T_K$, between 210° C. and 250° C.

4. The method according to claim 1 further comprising a pump for conveying metal bath from a tank to the cooling unit and to the filter downstream from it.

5. The method according to claim 4, further comprising a heating unit placed upstream from the cooling unit.

6. The method according to claim 5, wherein the heating unit is heated with waste gas.

7. The method according to claim 4, wherein the filter is a ceramic foam filter made of silicon carbide or aluminum oxide.

8. The method according to claim 4, wherein the cooling unit is formed by a downhill grade and can have its inclination changed.

9. The method according to claim 1, wherein a pump is used for conveying a tin metal bath from a tank to the cooling unit and to the filter downstream.

* * * * *

UNITED STATES PATENT AND TRADEMARK OFFICE
CERTIFICATE OF CORRECTION

PATENT NO.    : 6,638,436 B2
DATED         : October 28, 2003
INVENTOR(S)   : Elbern, Klaus It is certified that error appears in the above-identified patent and that said Letters Patent is hereby corrected as shown below:

Column 6,
Line 48, change "T,," to -- $T_H$ --.

Signed and Sealed this

Seventeenth Day of August, 2004

JON W. DUDAS
*Acting Director of the United States Patent and Trademark Office*